(12) United States Patent
Alkhatib et al.

(10) Patent No.: US 8,407,366 B2
(45) Date of Patent: Mar. 26, 2013

(54) INTERCONNECTING MEMBERS OF A VIRTUAL NETWORK

(75) Inventors: Hasan Alkhatib, Kirkland, WA (US);
Changhoon Kim, Bellevue, WA (US);
Geoff Outhred, Seattle, WA (US);
Deepak Bansal, Redmond, WA (US);
Albert Greenberg, Seattle, WA (US);
Dave Maltz, Bellevue, WA (US);
Parveen Patel, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 121 days.

(21) Appl. No.: 12/780,673

(22) Filed: May 14, 2010

(65) Prior Publication Data

US 2011/0283017 A1     Nov. 17, 2011

(51) Int. Cl.
*G06F 15/173*   (2006.01)
(52) U.S. Cl. .................... 709/238; 709/239; 709/245
(58) Field of Classification Search ......... 709/238–239, 709/227–228, 244, 229, 225, 245; 718/1; 370/392
See application file for complete search history.

(56) References Cited

U.S. PATENT DOCUMENTS

| | | | |
|---|---|---|---|
| 6,697,872 B1* | 2/2004 | Moberg et al. ................ | 709/238 |
| 7,478,173 B1 | 1/2009 | Delco | |
| 2003/0212898 A1 | 11/2003 | Steele | |
| 2005/0066060 A1 | 3/2005 | Pinkerton et al. | |
| 2007/0140128 A1 | 6/2007 | Klinker et al. | |
| 2007/0280243 A1* | 12/2007 | Wray et al. ................... | 370/392 |
| 2008/0225755 A1 | 9/2008 | Ishizaki | |
| 2009/0288084 A1 | 11/2009 | Astete | |
| 2009/0292858 A1 | 11/2009 | Lambeth et al. | |
| 2009/0307334 A1 | 12/2009 | Maltz | |
| 2010/0088708 A1* | 4/2010 | Macchiano et al. .......... | 719/313 |
| 2010/0107162 A1* | 4/2010 | Edwards et al. ................ | 718/1 |
| 2010/0115101 A1* | 5/2010 | Lain et al. .................... | 709/227 |
| 2010/0223397 A1* | 9/2010 | Elzur .......................... | 709/235 |

FOREIGN PATENT DOCUMENTS

| | | |
|---|---|---|
| WO | 2009111799 | 9/2009 |
| WO | 2009146165 | 12/2009 |

OTHER PUBLICATIONS

PCT International Application No. PCT/US2011/034191, International Search Report dated Dec. 12, 2011.

(Continued)

*Primary Examiner* — Abdullahi Salad
(74) *Attorney, Agent, or Firm* — Shook Hardy & Bacon LLP

(57) ABSTRACT

Computerized methods, systems, and computer-readable media are provided for establishing and managing a virtual network (V-net) and virtual machine (VM) switches that enable protected and isolated interconnections between members of the V-net. The V-net members include an originating network adapter that generates data packets addressed to a destination network adapter. Upon detecting data-packet generation, a source-side VM switch accesses a forwarding table associated with the V-net, ascertains a destination-side, VM-switch locator that corresponds to an identifier of the destination network adapter, and modifies the data packets to include the identifier. The forwarding table represents a mapping between the members of the V-net and VM switches located on respective nodes within the data center. In operation, the mapping enforces communication policies that govern data-packet traffic. Upon receiving the data packets, the destination-side VM switch restores the data packets and forwards them to the destination network adapter.

11 Claims, 6 Drawing Sheets

OTHER PUBLICATIONS

Virtualization Beyond the Data Center: Increase Network Infrastructure Utilization and Efficiency to Reduce Operational Costs—Published Date: 2009, http://www.cisco.com/en/US/prod/collateral/switches/ps5718/ps708/white_paper_c11-531009.pdf.

A Multi-Site Virtual Cluster System for Wide Area Networks—Published Date: 2008 https://www.usenix.org/events/lasco08/tech/full_papers/hirofuchi/hirofuchi_html/.

Beyond Virtual Data Centers: Toward an Open Resource Control Architecture—Published Date: 2007 http://www.cs.duke.edu/nicl/pub/papers/vci07.pdf.

On Virtual Data Centers and their Operating Environments—Published Date: Mar. 8, 2001 http://www.hpl.hp.com/techreports/2001/HPL-2001-44.pdf.

* cited by examiner

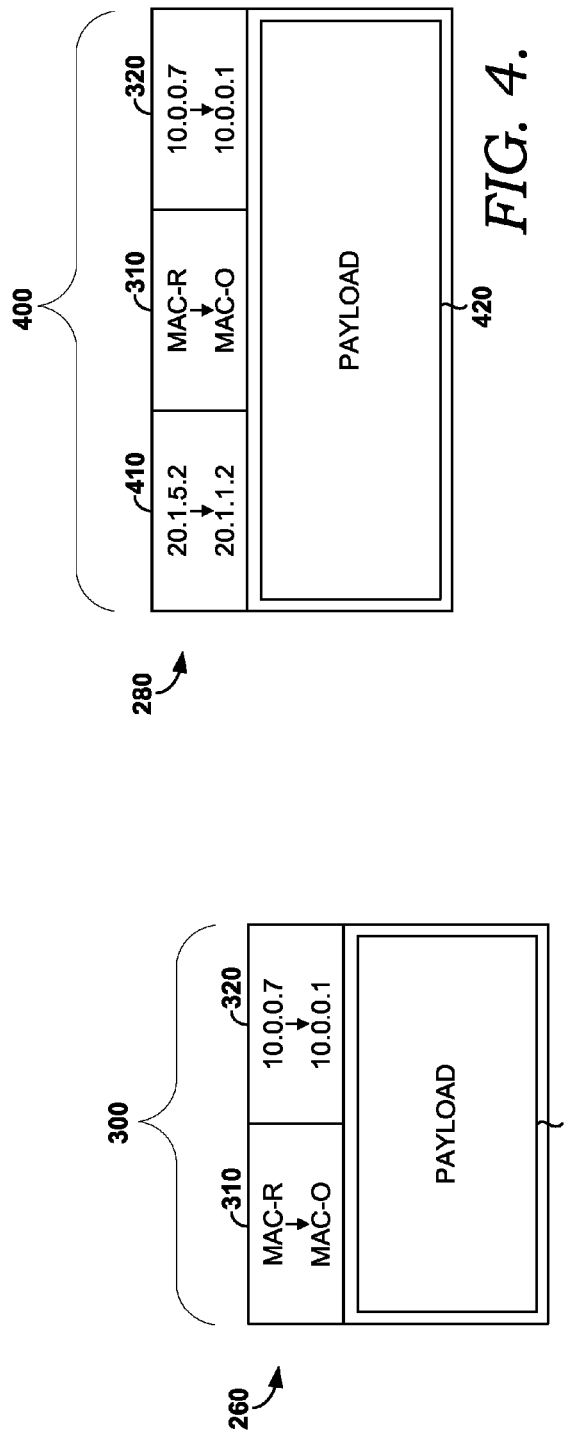
FIG. 3.
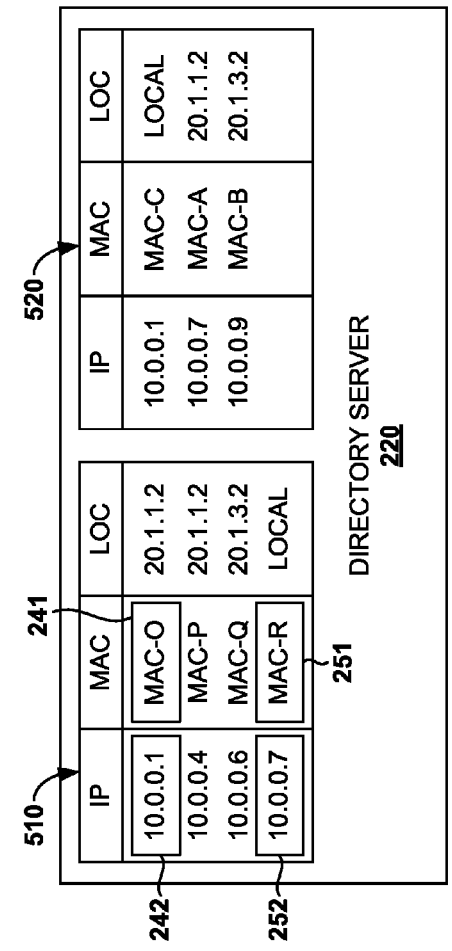
FIG. 4.
FIG. 5.

INTERCONNECTING MEMBERS OF A VIRTUAL NETWORK

BACKGROUND

Large-scale networked systems are commonplace platforms employed in a variety of settings for running service applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine running on a physical host. When the data center hosts multiple tenants (e.g., customer programs), these resources are allocated from the data center to the different tenants to meet their usage requirements.

Customers of the data center often require service applications running in an enterprise private network (e.g., server managed by a customer that is geographically remote from the data center) to interact with the software being run on the resources in the data center. To separate the resources allocated to a tenant securely from resources allocated to other tenants, a hosting service provider may carve out a dedicated physical network from the data center, such that the dedicated physical network is set up exclusively for that tenant and often as an extension of that tenant's enterprise private network. However, because the data center is constructed to dynamically increase or decrease the number of resources allocated to a particular customer (e.g., based on a processing load), it is not economically practical to carve out the dedicated physical network and statically assign the resources therein to an individual customer.

Further, when carving out the dedicated physical network from the data center and combining the resources therein with resources located at the enterprise private network, there is a potential for overlap in the internet protocol (IP) address space used by different customers. Also, there is a potential for exhaustion of IP addresses reserved for the data center when a substantial computing load, demanding a multitude of resources, is placed upon the dedicated physical network. As such, employing emerging technologies to generate isolated groups of resources (e.g., virtual networks (V-nets)) that are dynamically resized to satisfy customer demand and that are interconnected via software-based, virtual machine (VM) switches would circumvent IP-address namespace limitations, enhance scalability of resources allocated to a customer within the data center, and serve to isolate the network communications of customers and prevent unwanted communication between customers.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide a reachability-isolation mechanism that addresses the issue of protecting the integrity of a customer's service application running in a cloud computing platform, which is configured to allow multiple tenants (e.g., tens of thousands per cloud) to share the computing resources in a cloud-service data center. Generally, the reachability-isolation mechanism supports secured communication between network adapters allocated to the service application, while virtually partitioning the allocated network adapters from other resources in a data center. In embodiments, a virtual machine or a physical machine has one or more network adapters running thereon. To achieve secured communication, in embodiments, the reachability-isolation mechanism employs virtual networks (V-nets) that function to manage the flow of data packets therein and, at the same time, prevent unauthorized communications.

In an exemplary embodiment, a V-net is established within a data center of the cloud computing platform that includes, as members, a group of network adapters that are joined and bound to the V-net by a fabric controller. The network adapters comprising a v-net may include any combination of physical and virtual network adapters. Typically, the fabric controller is a management component implemented to monitor and control the life cycle of machines (e.g., virtual and physical machines) within a data center. Upon establishing the V-NET, the fabric controller communicates the membership of the V-net to a directory server, which, in turn, writes identifiers of the member network adapters to a forwarding table associated with both the V-net and the service application supported by the V-net.

The fabric controller may also be responsible for instantiating VM switches within nodes of the data center, where a node may include a server, a physical machine, or a network switch. By way of example, the fabric controller may instantiate a single VM switch on each server of one or more data centers that hosts members of the V-net. The fabric controller may further assign a unique locator to each of the VM switches and alert the directory server of the existence of the VM switches for recordation within the forwarding tables.

In embodiments, the VM switches serve as bridges to interconnect those member network adapters of the V-net residing on nodes in the data center with other member network adapters residing on nodes distributed throughout the data center, in other data centers, or in the enterprise private network(s) located at the customer's own premises. A VM switch may be realized by code or hardware, among other mechanisms. A VM switch may be realized on a server, a physical machine, a network interface card, a network switch, a network router, a network element, or the functionality of a VM switch may be divided among any combination of these. The VM switches create these connections by interacting with the directory server, which instructs the VM switch where and how to transmit data packets generated by a member network adapter of the V-net. In operation, the VM switch modifies and/or encapsulates and transmits the data packets such that the headers thereof are altered to include an address of the VM switch that receives the data packets. This process of modification and/or encapsulation can form a secure tunnel between the transmitting VM switch (e.g., source-side VM switch) and the receiving VM switch (e.g. destination-side VM switch). The secure tunnel ensures safe and direct passage of the data packets across a network, and, potentially, over firewalls and other protective measures, when connecting across data centers and across enterprise private networks.

Once received at the destination-side VM switch, the data packets are restored and/or decapsulated and the original headers revealed. The data packets are then distributed within the same node to the member network adapter of the V-net as indicated by the headers. Embodiments may determine which network adapters are to receive the packets through means such as a target identifier, the MAC address, the IP address, or a table that maps information carried in the header to a list of network adapters. In one embodiment, the target identifier of the member network adapters are utilized when locally passing the data packets within a node, while a locator of the destination-side VM switch is utilized when passing the data packets across a network. Advantageously, network-wide limitations on the number and type of IP addresses that may be assigned to the network adapters connected therein are removed. Thus, the reachability-isolation mechanism promotes scalability of the network adapters within a network without being restricted by a limited number of IP addresses reserved for that network.

BRIEF DESCRIPTION OF THE DRAWINGS

Embodiments of the present invention are described in detail below with reference to the attached drawing figures, wherein:

FIG. 3 is a schematic depiction of an exemplary structure of a data frame that is unencapsulated or decapsulated, in accordance with an embodiment of the present invention;

FIG. 4 is a schematic depiction of an exemplary structure of a data frame that is encapsulated by a source-side virtual machine (VM) switch, in accordance with an embodiment of the present invention;

FIG. 5 is a schematic depiction of exemplary forwarding tables associated with V-nets being hosted on a directory server, in accordance with an embodiment of the present invention;

DETAILED DESCRIPTION

Figure 1:
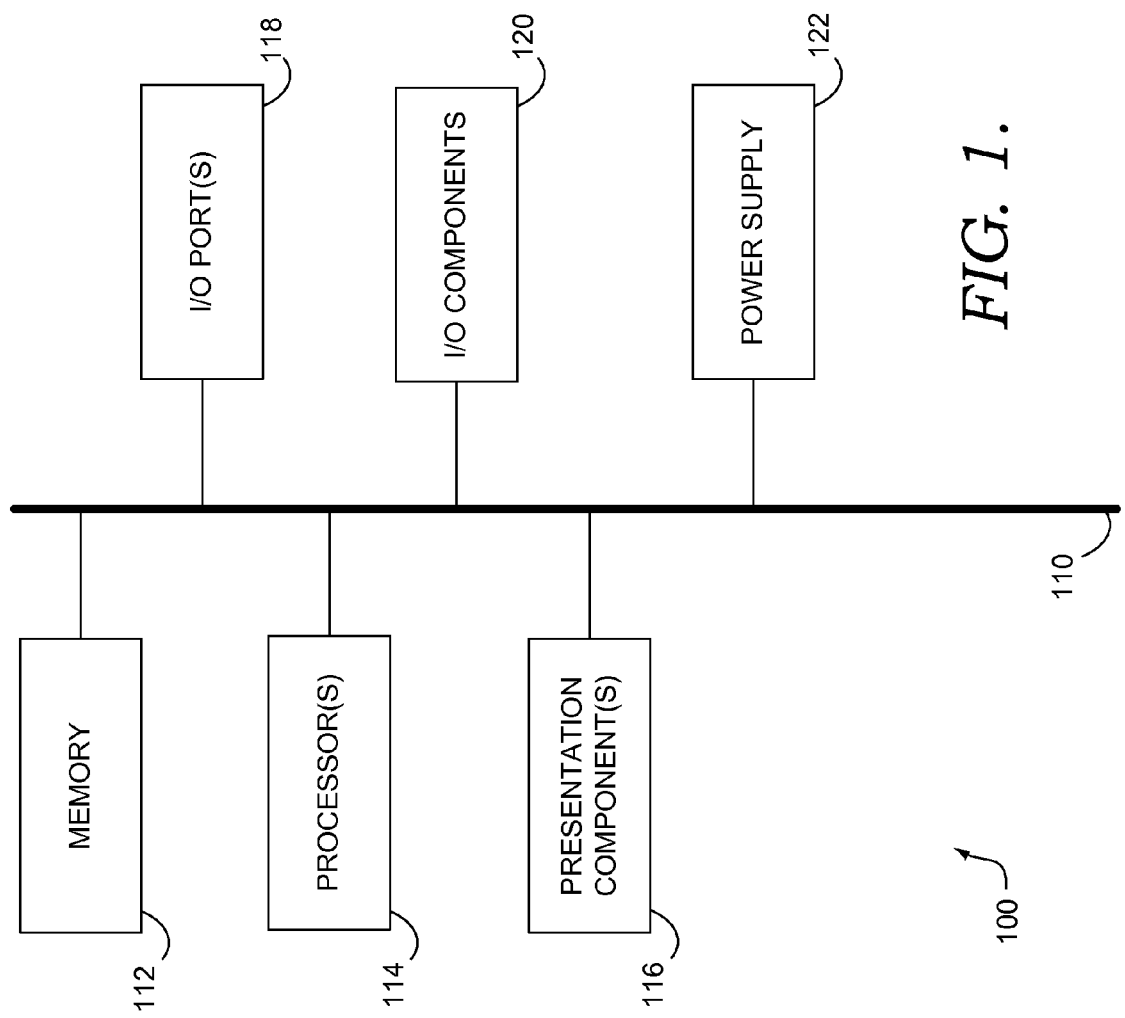
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for automatically establishing and managing a virtual network (V-net) and virtual machine (VM) switches that support protected and isolated interconnections between member network adapters of the V-net. In one aspect, embodiments of the present invention relate to one or more computer-readable media having computer-executable instructions embodied thereon that, when executed, perform a method for managing distribution of data packets between members of the V-net, which are isolated from other resources that don't belong to the V-net in a data center. In embodiments, the method includes the step of providing a first V-net that comprises a plurality of members (e.g., network adapters running on a virtual machine and/or a physical machine) allocated to a first service application running, in part, within a data center. Typically, the plurality of members includes an originating network adapter and a destination network adapter. The method further involves the step of detecting the originating network adapter attempting to transmit one or more data packets to the destination network adapter. In embodiments, as discussed more fully with reference to FIGS. 3 and 4, the data packets are structured with a header that includes a target identifier (e.g., internet protocol (IP) address and/or media access control (MAC) address) that points to the destination network adapter.

Upon detecting the transmission of the data packets, a source-side VM switch performs a resolution process that includes the steps of accessing a forwarding table that is associated with the first V-net, and discovering a locator of a destination-side VM switch, listed in the forwarding table, that corresponds to the target identifier. In an exemplary embodiment, the forwarding table represents a mapping between the plurality of members allocated to the first service application and VM switches that are each located on respective nodes within the data center, where the mapping is designed according to communication policies that govern data-packet traffic between the plurality of members. The data packets are then encapsulated to include the destination-side-VM-switch locator in expanded new header. Generally, the destination-side VM switch is responsible for distributing the data packets to the destination network adapter within a first node of the data center.

In another aspect, embodiments of the present invention relate to a computer system for supporting and isolating communications between network adapters that are allocated to a service application. Initially, the computer system includes an originating network adapter, a destination network adapter, a directory server, a destination-side VM switch, and a source-side VM switch. The originating network adapter, in embodiments, generates one or more data packets structured with headers that include a target identifier. Typically, the target identifier points to a destination network adapter, where the destination network adapter and the originating network adapter are members of a V-net allocated to one or more service applications running, in part, within at least one data center. Further, the destination network adapter resides on a first node of a data center, while the originating network adapter resides on a second node of the same data center or another data center.

The computer system also includes a directory server that maintains a forwarding table associated with the V-net. In one instance, the forwarding table is populated with identifiers of members of the V-net mapped to locators of respective VM switches. The computer system may support operation of the destination-side VM switch, which resides on the first node of the data center and is responsible for distributing the data packets to the destination network adapter. In addition, the computer system may support operations of the source-side VM switch, which resides with the originating network adapter on a second node of the data center, reads the headers of the data packets, and conveys the target identifier to the directory server. Upon receiving the target identifier, the directory server compares the target identifier against the forwarding table to determine whether the destination-side VM switch is mapped to the target identifier. If so, the source-side VM switch appends a frame to the headers of the data packets that includes a locator of the destination-side VM switch. Incident to appending a frame to the headers, the source-side VM switch forwards the packets to the destination-side VM switch. Upon receipt, the destination-side VM switch restores the headers of the data packets by removing the frame and verifies the target identifier with the directory server.

In yet another aspect, embodiments of the present invention relate to a computerized method for overseeing expansion of a V-net managed by a fabric controller within a data center. In one embodiment, the method involves assigning a routing information (e.g., internet-layer (layer-3) locator) to a network component. Generally, the network component represents either a software-based component that resides on a node of the data center (e.g., VM switch) or a physical network component (e.g., top-of-rack switches, network interface cards, physical switch, and the like). The method may further include the following steps: detecting an increase in resource usage of a service application; instantiating a network adapter on the node; and allocating the network adapter to the service application by joining the network adapter to a group of member network adapters bound to the V-net. In an exemplary embodiment, the network adapter is provided with an IP address.

Upon allocating the network adapter to the service application, the IP address of the joined network adapter is communicated to a directory server. The directory server is configured to store the assigned routing information of the network component in association with the IP address of the joined network adapter when the network component and the joined network adapter commonly reside on the same node. In another embodiment, the joined network adapter is provided with a media access control (MAC) address that uniquely identifies the joined network adapter within the context of the data center. As with the IP address, the MAC address assigned to the joined network adapter may be communicated to the directory server, which stores the MAC address in association with the routing information of the network component. Thus, the MAC address allows for finding the joined network adapter when utilizing overlapping IP address ranges for various V-nets in the data center.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
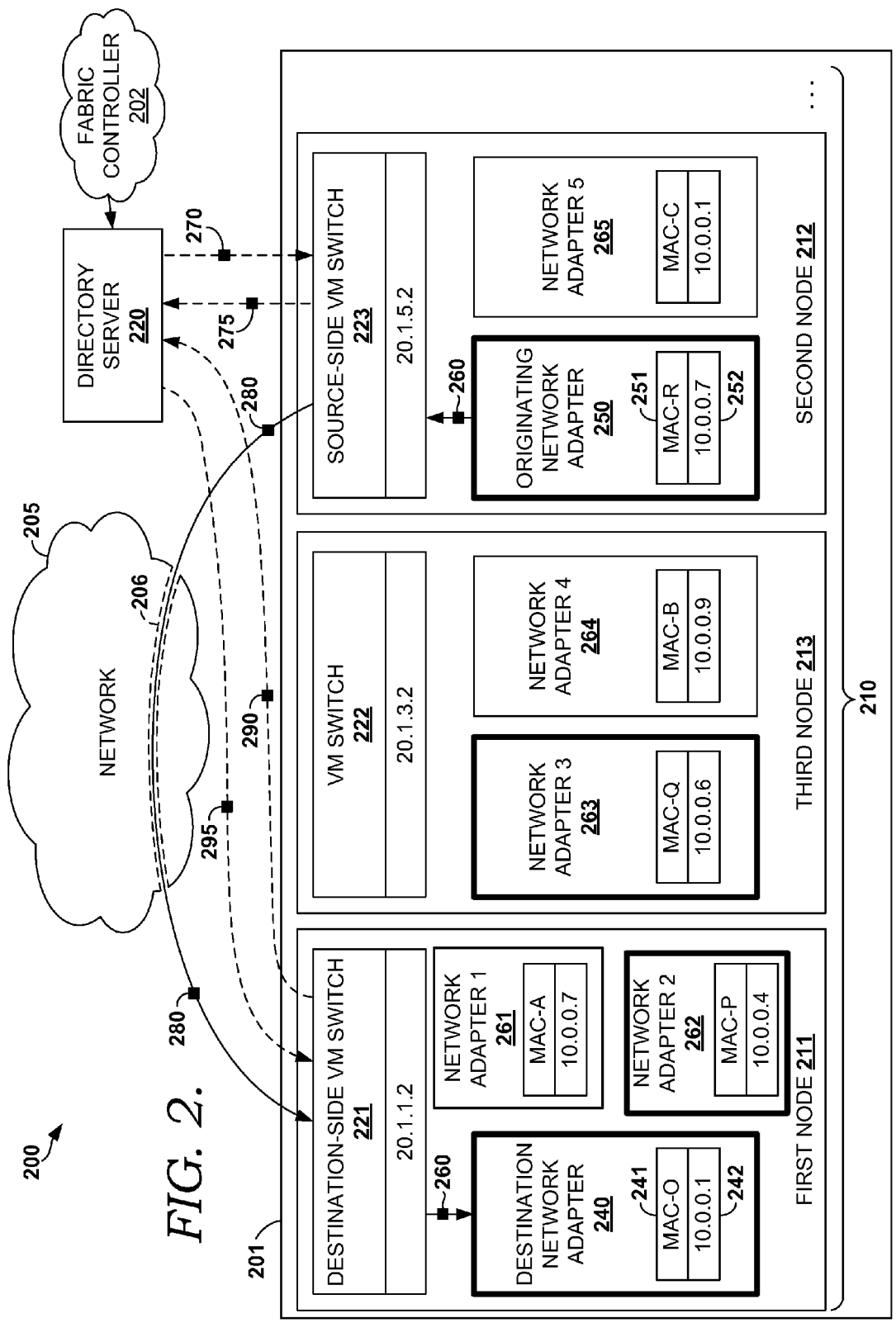
FIG. 2 is a block diagram illustrating an exemplary cloud computing platform, suitable for use in implementing embodiments of the present invention, that is configured to allocate and oversee virtual networks (V-nets) within a data center.

With reference to FIGS. 1 and 2, a first node 211, a second node 212, and/or a third node 213 may be implemented by the exemplary computing device 100 of FIG. 1. Further, originating network adapter 250, destination network adapter 240, network adapters 261, 262, 263, 264, and 265, destination-side VM switch 221, VM switch 222, and source-side VM switch 223 may access portions of the memory 112 of FIG. 1 and run on portions of the processors 114 of FIG. 1.

Turning now to FIG. 2, a block diagram is illustrated, in accordance with an embodiment of the present invention, showing an exemplary cloud computing platform 200 that is configured to allocate and oversee V-nets established within a data center 201 that support isolated interconnection of components comprising a service application. It will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud computing platform 200 may include one or more data centers (e.g., data center 201) that comprise nodes (e.g., nodes 211, 212, and 213) for hosting service applications and other software. Per embodiments of the present invention, the nodes 211, 212, and 213 represent any form of computing devices, such as, for example, a personal computer, a desktop computer, a laptop computer, a mobile device, a consumer electronic device, server(s), the computing device 100 of FIG. 1, and the like. In one instance, the nodes 211, 212, and 213 host and support the operations of the network adapters 240, 250, and 261-265, while simultaneously hosting other virtual machines carved out for supporting other tenants of the data center 201. As used herein, the term "tenants" generally refers to service applications owned by a customer of the cloud computing platform 200.

In one aspect, the network adapters 240, 250, and 261-265 operate within the context of the cloud computing platform 200 and, accordingly, communicate internally through connections dynamically made between the network adapters 240, 250, and 261-265, and externally through a physical network topology to resources of a remote network (e.g., resources 696 of the enterprise private network 695). The internal connections may involve interconnecting the network adapters 240, 250, and 261-265, distributed across physical resources of the data center 201, via a network 205. The network 205 interconnects these resources such that the originating network adapter 250 may recognize a location of the destination network adapter 240, and other network adapters, in order to establish a communication therebetween. In another embodiment, the network 205 interconnects the resources such that a packet of data addressed to a destination VM switch 221 and sent to the network 205 will be delivered by the network 205 to the destination VM switch 221. In addition, the network 205 may establish this communication over channels (e.g., secure tunnel 206) connecting the network adapters of the service application(s). By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

The cloud computing platform 200 includes the data center 201 configured to host and support operation of network adapters 240, 262, 263, and 250 of a first service application (represented by the thick-lined blocks), and network adapters 261, 264, and 265 of a second service application (represented by the thin-lined blocks). The phrase "service application," as used herein, broadly refers to any software, or portions of software, that runs on top of, or accesses storage locations within, the data center 201, another data center (e.g., second data center 670 of FIG. 6) within the cloud computing platform 200, resources in an enterprise private network (e.g., resources 696 of the enterprise private network 695 of FIG. 6) located on a customer's premise, and/or resources in a third-party network (e.g., third-parry data center 685 of FIG. 6). In one embodiment, one or more of the network adapters 240, 250, and 261-265 may represent portions of software, component programs, or instances of roles that participate in the service application(s). In another embodiment, one or more of the network adapters 240, 250, and 261-265 may represent stored data that is accessible to the service application. It will be understood and appreciated that the network adapters 240, 250, and 261-265 shown in FIG. 2 are merely an example of suitable parts to support the service application and are not intended to suggest any limitation as to the scope of use or functionality of embodiments of the present invention.

Although two service applications distributed over the three nodes 211, 212, and 213 in a single data center 201 have been described, it should be understood and appreciated that any number of service applications residing on any number of nodes within various data centers or other suitable devices may be used, and that embodiments of the present invention are not limited to those nodes, service applications, and data center(s) described herein. Further, any number of network adapters may be instantiated within the nodes and/or allocated to the service application(s), and the network adapters 240, 250, and 261-265 illustrated in FIG. 2 are shown for description purposes only.

Generally, the network adapters 240, 250, and 261-265 are allocated to the service application(s) by joining them as members of the V-net(s) based, in part, on demands (e.g., amount of processing load) placed on the service application(s). As used herein, the phrase "network adapter" is not meant to be limiting, and may refer to any software, application, operating system, component of a virtual machine, or program that is executed by a processing unit to underlie the functionality of the service application(s). Further, the network adapters 240, 250, and 261-265 may include processing capacity, storage locations, and other assets within the data center 201 to properly support, at least, the first and second service applications.

In an exemplary embodiment, a number of the network adapters 240, 250, and 261-265 are joined together in a group, or V-net, to provide underlying support of operations performed by the service applications running, in part, within a data center 201. By way of example, the destination network adapter 240, the originating network adapter 250, the network adapter 2 262, and the network adapter 3 263 may be joined together as members of a first V-net that supports operations of the first service application. Similarly, the network adapter 1 261, the network adapter 4 264, and the network adapter 5 265 may be joined together as members of a second V-net that supports operations of the second service application. As used herein, the phrase "virtual network," or "V-net," is not meant to be limiting, but may include any group of resources (e.g., network adapter running on a virtual machine and/or a physical machine) that enable the service applications to run within, or external to, the data center 201.

In instances, the V-nets represent a group of layer-2 resources, such as network adapters, that are isolated from other resources within a network 205 and that function to control a flow of data packets within the V-nets local broadcast domain based upon communication policies associated therewith. In other instance, the V-nets may represent a virtual local area network (VLAN), a virtual VLAN, a true VLAN, or any combination thereof. As more fully discussed below, the communication policies are enforced via the aid of a directory server 220. As such, V-nets enable reachability between members thereof, while isolating the members from other tenants and/or customers' service applications concurrently utilizing resources within the cloud computing platform 200.

In other words, the member machines of the V-nets, irrespective of their physical locations within the network 205, are directly reachable by other member machines, without network-device configuration or imposing name-space based limits on scalability. In one instance, technical primitives (e.g., VM switches 221, 222, and 223), available in end hosts (e.g., nodes 211, 212, and 213), can be installed in conventional or new networks to directly interconnect the members of the V-nets. In this role, the VM switches may be configured to encapsulate data packets, generated at the originating network adapter 250, to include an locator of the destination-side VM switch 221 in an additional header. Thus, encapsulation allows for directly routing data packets to the first node 211, via a tunnel 206, which can be further secured through standard security measures, on which the destination network adapter 240 resides.

In an exemplary embodiment, the V-net is composed of software-based components (e.g., network adapters residing on common or disparate network adapters) that are independent of underlying networking protocols and networking devices, such as physical routers. Accordingly, V-nets may be employed on any existing or new network. Further, V-nets can grow to infinite practically unlimited size in terms of its population of member machines, as communications sent therebetween are readdressed to a VM switch, as more fully discussed below. Thus, previous name-space limitations are lifted and IP address-space set by one tenant will not interfere with communication between machines allocated to other tenants. Further, any naming convention dictated by a service application may be used, as the locators of the VM switches 221, 222, and 223, which are used for routing data packets across the network 205, are controlled by the fabric controller 202. Thus, assigned identifiers, such as IP addresses, of network adapters in different V-nets may overlap within the data center 201.

By way of example, destination network adapter 240 is assigned IP address 10.0.0.1 while network adapter 5 265 is also assigned IP address 10.0.0.1. Conventionally, as both these network adapters 240 and 265 reside in the same data center 201, this overlap would cause confusion as to where data packets would be routed when addressed to the mutual IP address 10.0.0.1. However, because destination network adapter 240 (thick-lined block) is joined to the V-net associated with the first service application, and because network adapter 5 265 (thin-lined block) is joined to the V-net associated with the second service application, the directory server 220, in conjunction with one or more of the VM switches 221, 222, and 223, is able to navigate the data packets to the appropriate network adapter.

Resources may be assigned to the V-nets in a variety of ways. In one instance, the architecture of the data center 201 allows a management system (e.g., fabric controller 202) or administrators of the cloud computing platform 200 to construct isolation groups (e.g., protected pools of compute/storage machines). By way of example, the fabric controller 202 may establish a V-net by assembling a group of member resources and/or machines upon detecting an appearance of a new service application running in the data center 201. In addition, the fabric controller 202 may continually update the membership of the V-net upon detecting an increase or decrease in resource usage of the service application. When an increase is detected, the fabric controller 202 may instantiate a network adapter on one of the nodes 211, 212, or 213.

Or, the fabric controller 202 may reallocate one of the currently existing network adapters 240, 250, 261, 262, 263, 264, or 265. By way of example, the fabric controller 202 may access an existing data center and reprogram any existing networking devices therein to host a network adapter; thus, grouping of network adapters in a V-net is network-topology agnostic. In this instance the currently existing network adapters 240, 250, and 261-265 may be provided with IP addresses assigned by the fabric controller 202 or the tenants. When assigned by a tenant, the IP addresses (e.g., layer-3, IP addresses set by tenants) may be flat, customer-specific names that have no topological significance pertaining to the shared, underlying physical networks.

Once the network adapter(s) are allocated to the service application, they are joined to the group of member network adapters bound to the V-net associated with the service application. This new membership is recorded upon the fabric controller 202 communicating the IP and/or MAC address of the joined network adapter to the directory server 220. As more fully discussed below, the directory server 220 is configured to store the IP and/or MAC address of the newly joined network adapter in association with the V-net and/or the service application. In this way, the communication policies of the service application are enforced on the newly joined network adapter by the directory server 220. In embodiments, the directory server 220 may enforce the communication policies upon the newly joined network adapter attempting to send data packets within the V-net, or upon another network adapter attempting to transmit communications to the newly joined network adapter.

As discussed above, embodiments of the instant invention introduce a reachability-isolation mechanism that addresses the issue of protecting the integrity of a customer's service application running in the cloud computing platform 200. The protection issue is addressed by implementing isolated communication between resources (e.g., network adapters running on physical machines and/or virtual machines) allocated to the service application(s), while virtually partitioning the allocated resources from other resources in the data center 201. To achieve isolated communication, in embodiments, the reachability-isolation mechanism is supported by two different technologies operating in concert: the VM switches 221, 222, and 223; and the directory server 220.

The VM switches 221, 222, and 223, in embodiments, are provided to offer isolated connectivity between machines within the data center 201 or beyond the data center 201, as more fully discussed with reference to FIG. 6. As used herein, the phase "virtual machine switch," or "VM switch," is not meant to be limiting, but may encompass any software-based component that resides within a data center, enterprise private network, third-party network, etc., and that is responsible for securely routing data packets across a network between members of the V-net. By way of example, the VM switch may be any network-edge device(s) (e.g., top rack switches, physical network interface cards in nodes, virtual interface cards in VMs, or a networking stack in non-virtualized hosts) that expose some application programming interface (API) for network management. In other examples, all or a portion of the operations carried out by the VM switch (e.g., communication with the directory server 220, encapsulation, decapsulation, modification of packets, and other actions that contribute to reachability isolation of network adapters joined to the V-net) may be performed by a V-net routing module. As such, the usage of the phrase "VM switch" is meant to broadly refer to one or more of V-new routing module(s), network edge device(s), physical switch(es), routing device(s), and the like.

In embodiments, the process of routing involves, at least, detecting an attempt to transmit data packets, performing a resolution process to discover a VM switch listed in the forwarding table (e.g., forwarding tables 510 and 520 of FIG. 5) that corresponds to the destination of the data packets, encapsulating the data packets to include a VM-switch locator in an expanded header, and transmitting the encapsulated data packets over the network 205. As such, the encapsulated data packets traverse the network 205 in an isolated manner, ostensibly forming a tunnel 206 that carries the data packets directly to a receiving VM switch (e.g., destination-side VM switch 221) that resides on the same node (e.g., first node 211) that hosts the intended destination of the data packets (e.g., destination network adapter 240). Furthermore, the tunnel may be secured independently through standards cryptographic security measures. In embodiments, the receiving VM switch is responsible for decapsulating the data packets by restoring the headers to their original format (i.e., removing the frame holding the VM-switch locator from the expanded header), and distributing the data packets to the proper destination network adapter.

In an exemplary embodiment, the VM switches 221, 222, and 223 are each installed on an individual node, respectively, and are responsible for receiving and encapsulating data packets within their individual node. Further, the VM switches 221, 222, and 223 are responsible for decapsulating and distributing data packets to the network adapters residing on their individual node. As illustrated in FIG. 2, destination-side VM switch 221 is installed on the first node 211, the VM switch 22s is installed on the third node 213, and the source-side VM switch 223 is installed on the second node 222. In one instance, the source-side VM switch 223 is responsible for receiving and encapsulating data packets transmitted from the originating network adapter 250, the network adapter 5 265, and any other network adapter located on the second node 212. In another instance, the destination-side VM switch 221 is responsible for decapsulating and distributing data packets directed to the destination network adapter 240, the network adapter 1 261, the network adapter 2 262, and any other network adapter located on the first node 211.

The VM switches may be dynamically instantiated on, or torn down from, a node within the data center 201 as a function of one or more factors, such as a rate of IP traffic, a computing load consumed by tenants of the data center 201, and whether a node is being brought online or taken offline. In one embodiment, the fabric controller 202 is responsible for instantiating or tearing down VM switches. In addition, the fabric controller 202 may also be responsible for assigning locators to new or currently operating VM switches. These locators may include a unique, layer-2, media access control (MAC) address, an Ethernet address, and/or an Internet-layer (layer-3), IP address that conforms with a data-center-wide naming scheme, in order to prevent overlapping VM-switch locators. In other embodiments, another authority within the cloud computing platform 200, such as a network administer, may assign locators or other identifiers to VM switches. Upon assigning a locator to the VM switch(es), the fabric controller 202 or administrator may be responsible for communicating the locator to the directory server 220, which is configured to store or update a forwarding table with the VM-switch locator.

Conventional physical mechanisms that direct data packets within a network (e.g., routers and hardware-based switches) suffer from error-prone reconfiguration issues that are resultant from individually reprogramming each of the network devices upon a new virtual machine being added to a data center. Further, these physical mechanisms inherently limit the number of concurrent local networks that can be established in a data center and restrict the number of bridges that may be formed through the data center, resulting in poor scalability. Furthermore, these physical mechanisms cannot extend beyond a layer-2 domain, thereby failing to provide seamless connectivity beyond a data center. All of these issues are resolved by employing the software-based VM switches 221, 222, and 223 within the data center 201, as the VM switches 221, 222, and 223 may be dynamically instantiated and torn down to satisfy demands of tenants running in the data center 201 without reconfiguring network devices or adding new hardware.

In embodiments, the directory server 220 is configured to maintain forwarding tables that provide a record of which network adapters belong to which tenant and, hence, to which V-net. As discussed above, the fabric controller 202 may be employed to send updates to the directory server 220 with current IP address associations between members of a V-net and associations between node-locations of the V-net members and VM switches (e.g., where each network adapter is physically positioned by the fabric controller 202 in the data center 201, and the communication policies of network traffic that should be enforced between network adapters in a particular V-net). Based on this record, the directory server 220 may enforce the communication policies that limit which network adapters are allowed to communicate with others. Advantageously, the directory server 220 allows new members of V-net(s) to be exposed as available incident to instantiation, without network-device configuration, delayed convergence, or propagation latency. That is, conventional physical devices are listed in a routing-control plan, which is converted, configured, and programmed into every intermediate switching-hub upon an update to a service application in order for the physical devices to understand how to route a data packet. The directory server 220 ameliorates these problems by providing dynamically updated forwarding tables at a particular location that is accessible by VM switches.

In an exemplary embodiment, the forwarding tables maintain one or more logical associations between interconnected network adapters and enforces access control associated with the network adapters in order to achieve network reachability. In one instance, the logical associations pertain to an association between members of a V-net. By way of example, with reference to FIG. 5, the forwarding table 510 includes the logical associations between member network adapters of the first service application, while the forwarding table 520 includes the logical associations between member network adapters of the second service application. In particular, the forwarding table 510 lists the identifiers of the destination network adapter 240 (IP address 10.0.0.1 and MAC address MAC-O), the network adapter 2 262 (IP address 10.0.0.4 and MAC address MAC-P), the network adapter 3 263 (IP address 10.0.0.6 and MAC address MAC-Q), and the originating network adapter 250 (IP address 10.0.0.7 and MAC address MAC-R). Further, the forwarding table 510 lists the locators (e.g., IP address) of the VM switch that is located on the same node as the destination network adapter 240 (destination-side VM switch 221 having IP address 20.1.1.2), the network adapter 2 262 (destination-side VM switch 221 having IP address 20.1.1.2), the network adapter 3 263 (VM switch 222 having IP address 20.1.3.2), and the originating network adapter 250 (source-side VM switch 223 having IP address 20.1.5.2).

In a substantially similar way, the forwarding table 520 lists the identifiers of the network adapter 5 265 (IP address 10.0.0.1 and MAC address MAC-C), the network adapter 1 261 (IP address 10.0.0.7 and MAC address MAC-A), and the network adapter 4 264 (IP address 10.0.0.9 and MAC address MAC-B). Further, the forwarding table 520 lists the locators (e.g., IP address) of the VM switch that is located on the same node as the network adapter 5 265 (source-side VM switch 223 having IP address 20.1.5.2), the network adapter 1 261 (destination-side VM switch 221 having IP address 20.1.1.2), and the network adapter 4 264 (VM switch 222 having IP address 20.1.3.2). As such, by querying the directory server 220, a VM switch is able to determine whether a target of a stream of data packets is in the same V-net as a source of the data-packet stream (e.g., in order to enforce communication policies), and what VM switch is located on the same node as the target of the data-packet stream (e.g., in order to readdress, or encapsulate, the data-packet stream to directly reach the VM switch).

As mentioned above, the directory server 220 employs the forwarding tables 510 and 520 to enforce a communication policy, which is typically set in place by a tenant via a service level agreement. In one instance, the communication policy is specifically designed for a service application and/or V-net and may include a list of permissions that governs which system processes are granted access to members of the V-net. In another embodiment, the communication policy may articulate what operations are allowed to be performed on those members. In another instance, the communication policy serves as a security model that scans the forwarding table(s) for applicable entries upon receiving a request for operation on a V-net member, and determines whether the requested operation is authorized based on information within the applicable entries. In yet another instance, the communication policies may represent rules applied to a port number or a network adapter, which are available within a node or data center, in order to ascertain whether the port number or network adapter is permitted to perform some operation (e.g., allowing both inbound and outbound network traffic).

In an exemplary operation, the network adapters 240, 250, 262 and 263 are allocated to the first service application (e.g., to satisfy the current processing load imposed by the first service application). As discussed above, the fabric controller 202 may be responsible for dynamically allocating the network adapters 240, 250, 262 and 263 within the data center 225. By way of example, the fabric controller 210 may rely on a service model (e.g., designed by a customer that owns the service application) to provide guidance on how and when to allocate the network adapters 240, 250, 262 and 263.

As part of the operation of the first service application, the originating network adapter 250 may attempt to send data packets 260 to another network adapter (e.g., destination network adapter 240) that is a member of the V-net associated with the first service application. In this instance, the originating network adapter 250 is provided with the target identifier or target IP address 242 (10.0.0.1) of the destination network adapter 240. Using the target IP address 242, the originating network adapter 250 may send a request to retrieve the target MAC address 241 (MAC-0) of the destination network adapter 240. Upon acquiring the target MAC address 241, the originating network adapter 250 may populate a header of the data packets 260 with the target MAC address 241 and the target IP address 242 to form the target identifier. Further, the source identifier, such as source MAC address 251 (MAC-R) and/or source IP address 252 (10.0.0.7), may be assigned to, and known by, the originating network adapter 250, and may be populated into the header as well.

Referring to FIG. 3, a schematic depiction of an exemplary structure of the data packet 260, which is in an unencapsulated condition as sent from the originating network adapter 250, is shown, in accordance with an embodiment of the present invention. As illustrated, the data packet 260 is structured with a body 330 and a header 300. The body 330 is configured to carry a payload (e.g., data), while the header 300 is configured with frames 310 and 320 to indicate a destination of the payload. In embodiments, the frame 310 includes the source MAC address and the destination MAC address, while the frame 320 includes the source IP address and the destination IP address.

Returning to FIG. 2, upon sending the data packets 260, the source-side VM switch 223 detects and intercepts the data packets 260 prior to exiting the node (e.g., second node 212), on which both the source-side VM switch 223 and the originating network adapter 250 reside. Once in possession of the data packets 260, the source-side VM switch 223 may perform a resolution process to determine a locator of a VM switch (e.g., destination-side VM switch 221) that resides on the same node (e.g., first node 211) as the destination network adapter 240. In one embodiment, the resolution process includes assessing an index, or portion of the forwarding table 510 associated with the first service application, that is hosted on the second node 212. In one instance, this index may be generated by the source-side VM switch 223 by writing to cache locators of other VM switches corresponding to destination network adapters that the source-side VM switch 223 has previously retrieved from the directory server 220. Or, in another instance, the index may be generated by the fabric controller 202 upon communicating locators of one or more VM switches and their corresponding destination network adapters.

Incident to accessing the index local to the source-side VM switch 223, the source-side VM switch 223 may inspect the index to determine the locator of the VM switch (e.g., destination-side VM switch) that corresponds to the information populated within the header of the data packets 260. This determination may be made by comparing the target identifier (e.g., IP address 242 and/or target MAC address 241) against entries in the index to discover the appropriate VM-switch locator. When the appropriate VM-switch locator is determined, the locator is inserted into a frame that is attached to the header of the data packets 260 to created an expanded header.

Referring to FIG. 4, a schematic depiction of an exemplary structure of a data packet 280 that is encapsulated by the source-side VM switch 223 is shown, in accordance with an embodiment of the present invention. This encapsulated data packet 280 is structured with a body 420 and an expanded header 400. Similar to the data packet 260, the encapsulated data packet 280 may store a payload in the body 420. The expanded header 400 is configured with frames 310, 320, and 410 to indicate a VM switch that is local to the destination of the payload. In embodiments, the frame 310 includes the source MAC address and the destination MAC address, while the frame 320 includes the source IP address and the destination IP address, similar to the header 300 of the data packet 260 of FIG. 3. The frame 410 is populated with locators (e.g., IP addresses) of the source-side VM switch 223 and of the destination-side VM switch 221 determined from the index. As such, the encapsulated data packet 280 is addressed to traverse the network 205 via a secure tunnel 206 directly to the appropriate node (e.g., first node 211) on which the destination network adapter 240 resides.

If the index hosted on the second node 212 is incomplete or lacks the proper routing-report information to manage the broadcast of the data packets 260 upon receipt at the source-side VM switch 223, the source-side VM switch 223 may communicate with the directory server 200 to retrieve the locator of the VM switch (e.g., destination-side VM switch 221) local to the destination network adapter 240. By way of example, communicating with the directory server 220 to derive the destination-side-VM-switch locator may include accessing the forwarding table (e.g., forwarding table 510 of FIG. 5 that is associated with the first service application), which is maintained within the directory server 220, by sending a request message 275 to the directory server 220 that includes the target identifier (e.g., IP address 242, the target MAC address 241, or both). This target identifier and address(es) may be extracted from the header of the data packets 260 and incorporated as contents into a body of the request message 275.

The directory server 220 may apply these contents of the request message 275 to the forwarding table 510 to determine the appropriate identifier and/or locator. As discussed above, the forwarding table 510 represents a mapping between a plurality of V-net members allocated to the first service application and VM switches that are each located on respective nodes within the data center 201. In instances, mapping is designed according to communication policies that govern data-packet traffic between the plurality of members. By way of example, with reference to the forwarding table 510 of FIG. 5, the contents packaged within the request message 275 may include the network-layer (layer-3), source IP address 252 (10.0.0.7) and/or the data-link-layer (layer-2), source MAC address 251 (MAC-R) of the originating network adapter 250. Further, the contents of the request message 275 may include the target identifier—network-layer, target IP address 242 (10.0.0.1) and/or the data-link-layer, target MAC address 241 (MAC-O)—of the destination network adapter 240.

Utilizing the target identifier (e.g., target IP address 242 and/or the target MAC address 241), the directory server 220 is configured to perform, at least the following procedures: find the appropriate forwarding table 510 associated with the V-net including as a member the source or the target of the data packets 260; scan the forwarding table 510 with the target identifier (target IP address 242 and/or the target MAC address 241) to find a matching entry or listing; and read the locator 231 of a VM switch within the matching entry or listing. As illustrated, the matching listing includes the VM-switch locator represented by locator 231 (IP address 20.1.1.2). This matching locator 231 may be returned to the source-side VM switch 223 via a reply message 270, or any other form of communication known in the art.

In another embodiment, the directory service might not wait to receive a request for a matching entry. Instead, the directory service might push one or more entries from its tables to a VM switch or other component before they are requested. The directory service might chose to push entries to those VM switches or other components determined to be most likely to make a request for the pushed entries. For example, the directory service might push entries for a V-net to the VM switches that host members of the V-net. In other embodiements, another component, such as the Fabric Controller, might push the entries. In another embodiment, the entries themselves might be generated based on the communication policy, potentially before one more VMs referred to in the entries are created.

If the directory server 220 determines that an IP address of the matching locator 231, or other IP addresses involved in the communication of the data packets 260, collide (i.e., overlap within the address space of the data center 201) with the source IP address 252 or the target IP address 242, then actions may be taken by the directory server 220 or the source-side VM switch 223 to cure this issue. These actions may include assigning temporary identifiers or other IP addresses to the originating network adapter 250 and the destination network adapter 240, writing a key that deciphers the temporary identifiers to a storage location (e.g., a table in the directory server 220), and replacing the current identifiers or IP address(es) placed in the headers of the data packets 260 with the temporary identifiers, respectively. In this way, any confusion as to where the data packets 260 are to be delivered once inside the first node 211 is eliminated.

Returning to FIG. 2, upon retrieving the locator 231 at the source-side VM switch 223 via the reply message 270, the source-side VM switch 223 may encapsulate the data packets 260 within other data packets, or encapsulated data packets 280. These encapsulated data packets 280 are typically addressed with the VM-switch locator 231 of FIG. 3 in the header. As discussed above, the VM-switch locator 231 points to the destination-side VM switch 221.

In embodiments, encapsulating may refer to the act of reformatting and modifying the data-packet header to include another frame (e.g., see reference numeral 410 of FIG. 4) that includes the VM switch locator 231. Or, encapsulating may include replacing the original header with an expanded header that is composed of an outer frame (reference numeral 410 of FIG. 4). In embodiments, the outer frame may reference the identifier(s) (e.g., IP and/or MAC addresses) of the source-side VM switch 223 and the destination-side VM switch 221. Or, encapsulation may denote the act of prepending the another protocol header (e.g., IP or Ethernet) to the data packet(s), where the protocol header points to the destination-side VM switch 221 and/or the destination network adapter 240. Or, encapsulation may generally refer to rewriting a destination identifier within a data packet at the destination-side VM switch, while decapsualtion may involve restoring the rewritten, destination identifier upon receipt of the data packets at the source-side VM switch. Although various different processes that make up encapsulation, and the complimentary processes of decapsulation, have been described, it should be understood and appreciated that other types of suitable processes that provide readdressing or modifying data packets may be included in "encapsulation," and that embodiments of the present invention are not limited to those specific types of encapsulation described herein.

Further, the tunnel 206 (e.g., intra-data-center tunnel) may be established and secured to protectively pass the encapsulated data packets 280 across the network 205. The type and attributes of the tunnel 206 may based, in part, on a service request contract or service-level agreement (SLA) between the customer and administrator of the cloud computing platform 200. As such, when the customer is creating or conveying mission-critical data of high sensitivity, the secure tunnel 206 may include enhanced protective measures to ensure the safe transmittal of the encapsulated data packets 280.

Once the encapsulated data packets 280 are formed, they may be cached at the second node 212 and/or sent to the destination-side VM switch 221, residing on the first node 211, over the network 205 via the secure tunnel 206. In one instance, the source-side VM switch 223 may be responsible for tracking and scheduling the route of the encapsulated data packets 280 over intermediate switches along a hub. In another instance, the source-side VM switch 223 employs reliability mechanisms that account for lost/delayed packets and network congestion.

The source-side VM switch 221 is responsible for decapsulating the encapsulated packets 280 and distributing the original data packets 260, and other communications, to the destination network adapter 240 within the first node 211 of the data center 201. In embodiments, the destination-side VM switch 221 can also talk to the directory server 220 to enforce the communication policy stored therein. In an exemplary embodiment, the destination-side VM switch 221 will read the expanded header of the encapsulated data packets 280 to recognize whether it has been received at the appropriate VM switch, read the target and source identifiers, and send one or more of the target and/or source identifiers to the directory server 220 to determine verify that delivery was approved by the communication policies and corresponds with the forwarding table. By way of example, verification may include sending a verification message 290 to the directory server 220 and receiving a reply message 295 from the directory server 220 that communicates whether proper authenticated delivery has occurred. In instances, the verification message 290 may include information that reflects the information carried within the request message 275, discussed above.

During decapsulation, the destination-side VM switch 221 discards the outer frame (reference numeral 410 of FIG. 4) of the expanded header in the encapsulated data packets 280, and restores the header to an original format. Upon decapsualtion, destination-side VM switch 221 may inspect a local forwarding table using the contents of the restored header, and distribute the data packets 260 to the appropriate network adapter (e.g., destination network adapter 240) associated with the target identifiers (address(es) 241 and 242) within the header. As such, the data packets 221 are securely conveyed from the originating network adapter 250 to the destination network adapter 240 in an isolated manner, yet without extra safety-checks that may slow down the flow of the data-packet stream.

Figure 6:
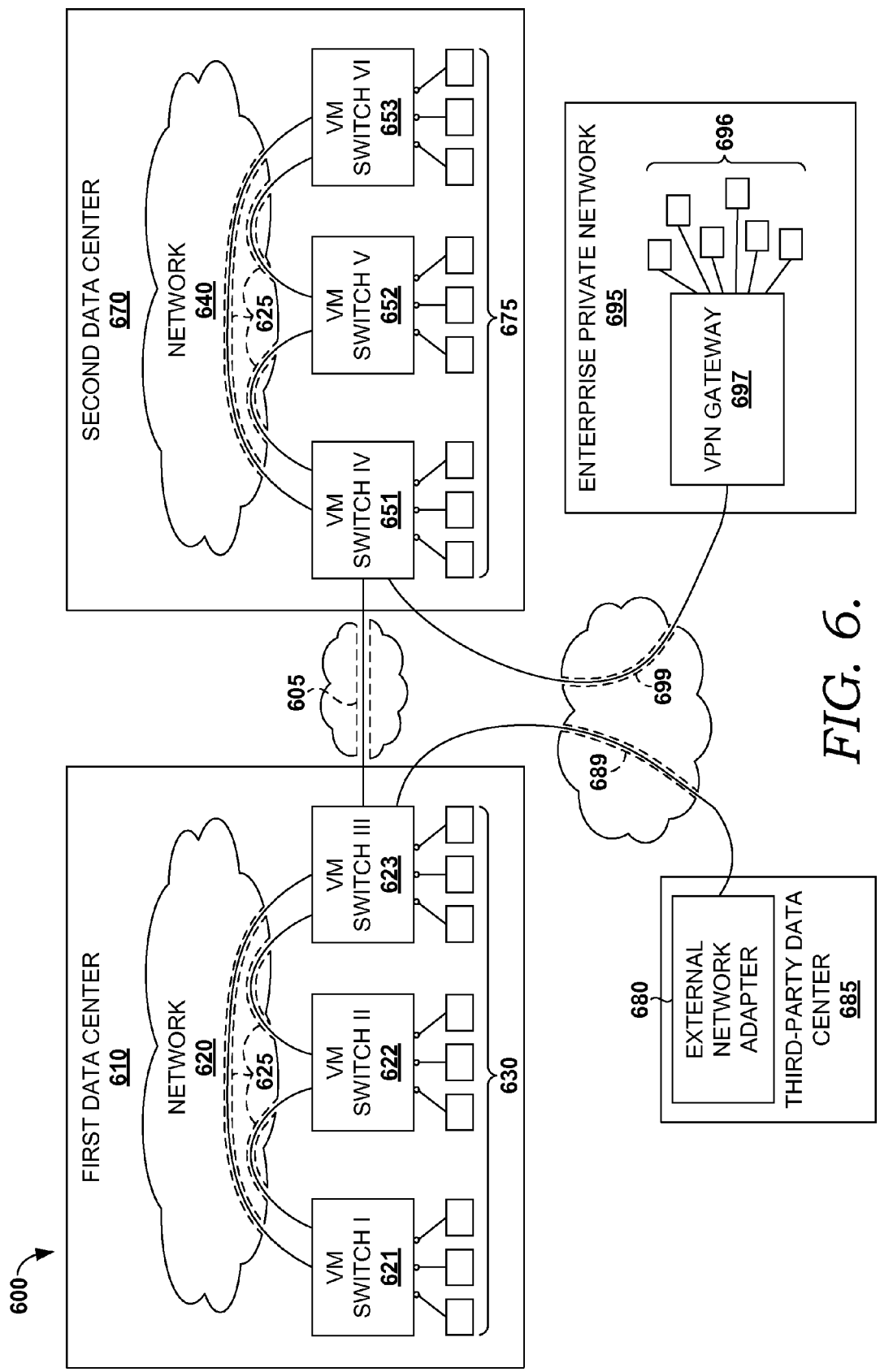
FIG. 6 is block diagram of an exemplary distributed computing environment with secured tunnels established to link VM switches that are provisioned with gateway functionality, in accordance with an embodiment of the present invention.

Referring now to FIG. 6, a block diagram illustrating an exemplary distributed computing environment 600 is shown with secured tunnel 605 established logically linking VM switches 623 and 651 that are provisioned with gateway functionality, in accordance with an embodiment of the present invention. Initially, the distributed computing environment 600 includes an enterprise private network 695, a third-party data center 685, and a cloud computing platform, as discussed with reference to FIG. 2, that includes a first data center 610 and a second data center 670.

In embodiments, the enterprise private network 695, the third-party data center 685, the first data center 610, and the second data center 670 may be communicatively connected over a physical network. As used herein, the phrase "physical network" is not meant to be limiting, but may encompass tangible mechanisms and equipment (e.g., fiber lines, circuit boxes, switches, antennas, IP routers, and the like), as well as intangible communications and carrier waves, that facilitate communication between network adapters at geographically remote locations. By way of example, the physical network may include any wired or wireless technology utilized within the Internet, or available for promoting communication between disparate networks.

Generally, the enterprise private network 695 includes resources 696 that are managed by a customer of the cloud computing platform 200 of FIG. 2. Often, these resources 696 host and support operations of components of the service application owned by the customer. Virtual private network (VPN) gateway 697 represents a VM switch hosted at the enterprise private network 695 that facilitates communication with a portion of the service application residing in the cloud computing platform 200, where the service-application portion may be accommodated within the first data network 610 or the second data network 670. In embodiments, the VM switches 621, 622, 623, 651, 652, and 653 may be instantiated within the data centers 610 and 620 to support operations of remotely distributed components of the service application running on network adapters 630 and 675. In operation, the VM switch IV 651 and the VPN gateway 697 work in concert with each other to ensure the service application runs properly and securely across the physical network. In one instance, working in concert involves transmitting between the VM switch IV 651 and the VPN gateway 697 data packets through a secure tunnel 699.

In embodiments, the third-party data center 685 includes resources, such as the external network adapter 680, that are managed by a third party and supports operations of the service application or of the cloud computing platform 200 of FIG. 2. Often, these resources host and support components of the service application owned by the customer. The external network adapter 680 may function as a VM switch hosted at the third-party data center 685 that facilitates communication with a portion of the service application residing in the cloud computing platform 200. By way of example, the external network adapter 680 may work in concert with the VM switch III 623 to transmit therebetween data packets through a secure tunnel 689.

Typically, the VM switches 621-623 and 651-653, the VPN gateway 697, and the external network adapter 680, include, or are linked to, some form of a computing unit (e.g., central processing unit, microprocessor, etc.) to support operations of the service-application component(s) running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the VM switches 621-623 and 651-653, the VPN gateway 697, and the external network adapter 680 to enable each device to perform a variety of processes and operations. In another instance, the computing unit may encompass a processor (not shown) coupled to the computer-readable medium accommodated by each of the VM switches 621-623 and 651-653, the VPN gateway 697, and the external network adapter 680. Generally, the computer-readable medium stores, at least temporarily, a plurality of computer software components (e.g., the network adapters 630 and 675) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Accordingly, there may exist multiple remote data centers (e.g., reference numerals 610, 670, and 685) that are interconnected and via secure tunnels 605, 689, and 699 attached to an on-premises, enterprise private network 695. These secure tunnels 605, 689, and 699 may offer protected data-packet passage using security mechanisms of encryption (e.g., tunneling protocols IP-sec, IP over HTTPS, Teredo, SSL, and the like) or authorization techniques. By way of example, gateway functionality is provisioned within one or more of the VM switch III 623, the VM switch IV 651, the external network adapter 680, and the VPN gateway 697. The gateway functionality initiates, mediates, and secures the external connectivity by making use of a combination of the tunneling protocols. As such, this gateway functionality provides location and boundary independence of the V-nets even when residing in geographically distributed hosts. Further, the gateway functionality may utilize layer-3 protocol to establish and address data packets in order to reach across the physical network. This is not possible with conventional network adapters that communicate in layer-2 protocol, which disallows direct communication over different broadcast domains.

In operation, the VM switch III 623, the VM switch IV 651, the external network adapter 680, and the VPN gateway 697 are each assigned a layer-3 locator, where the VM switches 623 and 651, as well as the external network adapter 680 and the VPN gateway 697, represent software-based components. The gateway functionality is employed to route encapsulated data packets to a destination network adapter, such as a network adapter at the third-party data center 685 or a network adapter residing on one of the resources 696. In exemplary embodiment, employing the gateway functionality involves applying transport protection to the encapsulated data packets, thereby affording a secure tunnel (e.g., reference numerals 605, 689, and 699) that traverses between the data centers 601 and 607, the third-party data center 680, and the enterprise private network 695, respectively. As such, the security measures discussed above are extended to operate beyond a single data center and offer secure and seamless connectivity between network adapters even when there is no direct layer-2 reachability or visibility between the data centers 601 and 607, the third-party data center 680, and the enterprise private network 695.

In one instance, separate VM switches used by various tenants of the data centers 610 and 670 are instantiated for the purpose of providing gateway functionality. In another instance, the gateway functionality is embedded into one or more of the VM switches 623 and 651 within the data centers 610 and 670, respectively. In this instance, the VM switches 623 and 651 are provided with a mechanism to determine whether data packets are being sent internally within a local data center or externally, based on a forwarding table. When it is determined that the data packets are addressed to send externally, the embedded gateway functionality is invoked to enforce certain transport protections, such as securing or encrypting a transmission and/or translating headers of the data packets when they include recycled target identifiers (i.e., target MAC and/or IP addresses). In other embodiments, the gateway functionality may support load balancing, caching, and other services that enhance distribution of data packets between local broadcast domains.

Figure 7:
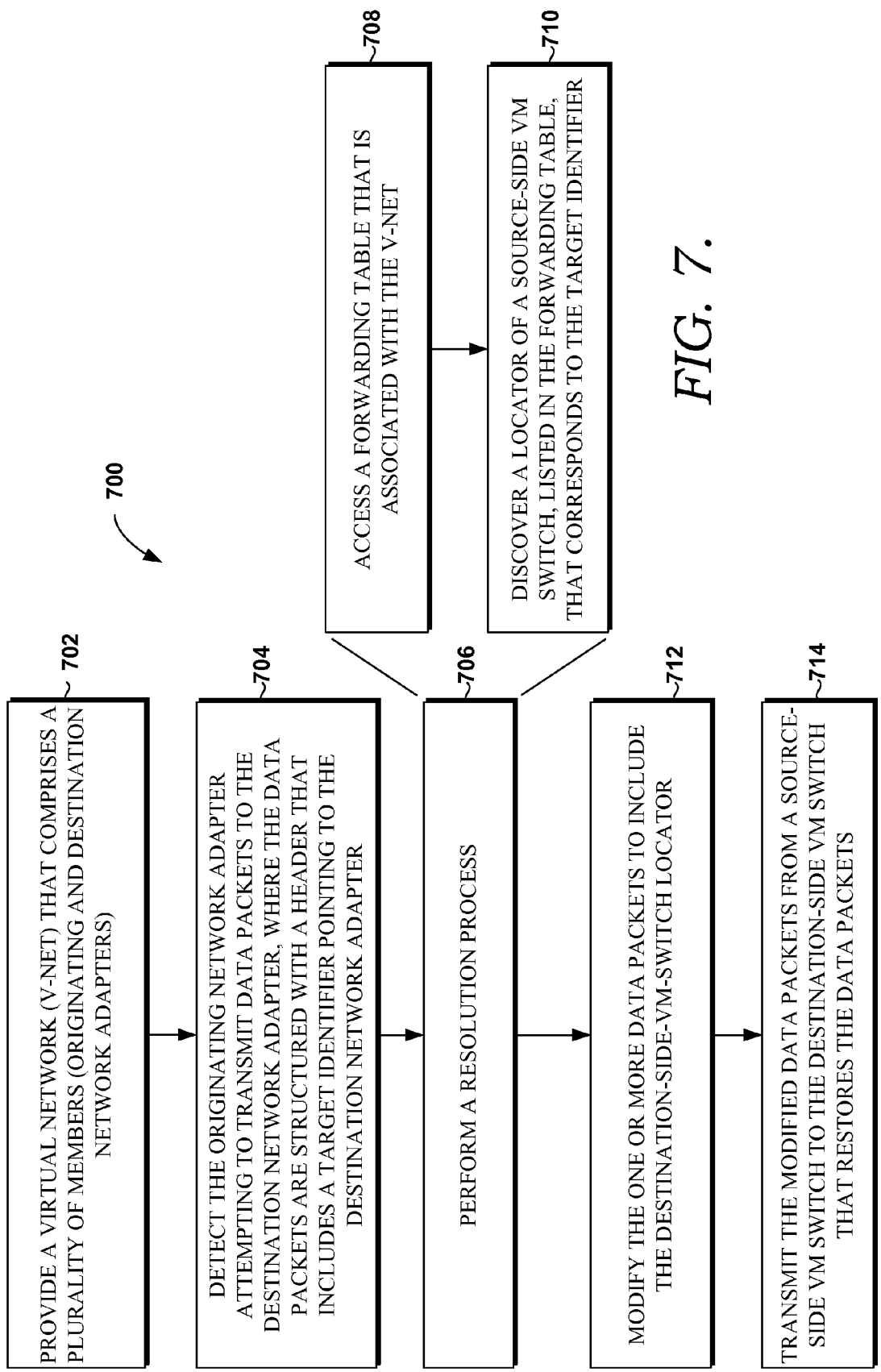
FIG. 7 is a flow diagram showing a method for managing distribution of data packets between members of a V-net that are isolated from other V-nets in a data center, in accordance with an embodiment of the present invention.

Turning now to FIG. 7, a flow diagram is illustrated that shows a method 700 for managing distribution of data packets between members of a V-net that are isolated from other machines in a data center, in accordance with an embodiment of the present invention. Initially, the method 700 involves the step of providing a first V-net that comprises a plurality of members (e.g., network adapters running on a virtual machine and/or a physical machine) allocated to a service application running, in part, within a data center, as indicated at block 702. Typically, the plurality of members include an originating network adapter and a destination network adapter. The method 700 may further involve the step of detecting the originating network adapter attempting to transmit one or more data packets to the destination network adapter, as indicated at block 704. In embodiments, as discussed more fully above with reference to FIGS. 3 and 4, the data packets are structured with a header that includes a target identifier that points to the destination network adapter.

Upon detecting the transmission of the data packets, a source-side VM switch (e.g., the source-side VM switch 223 of FIG. 2) performs a resolution process, as indicated at block 706. In embodiments, the resolution process may include the following steps, executed in any order: accessing a forwarding table that is associated with the first V-net (see block 708); and discovering a locator of a destination-side VM switch, listed in the forwarding table, that corresponds to a target identifier (see block 710). In an exemplary embodiment, the forwarding table (e.g., forwarding tables 510 and 520 of FIG. 5) represents a mapping between the plurality of members allocated to the first service application and VM switches that are each located on respective nodes within the data center, where the mapping is designed according to communication policies that govern data-packet traffic between the plurality of members. Generally, the destination-side VM switch (e.g., destination-side VM switch 221 of FIG. 2) is responsible for distributing the data packets to the destination network adapter within a node of the data center. The data packets are then encapsulated to include the destination-side-VM-switch locator in an expanded header (see block 712) and transmitted from the source-side VM switch to the destination-side VM switch (see block 714), which decapsulates and distributes the data packet internally within the node to the destination network adapter.

Figure 8:
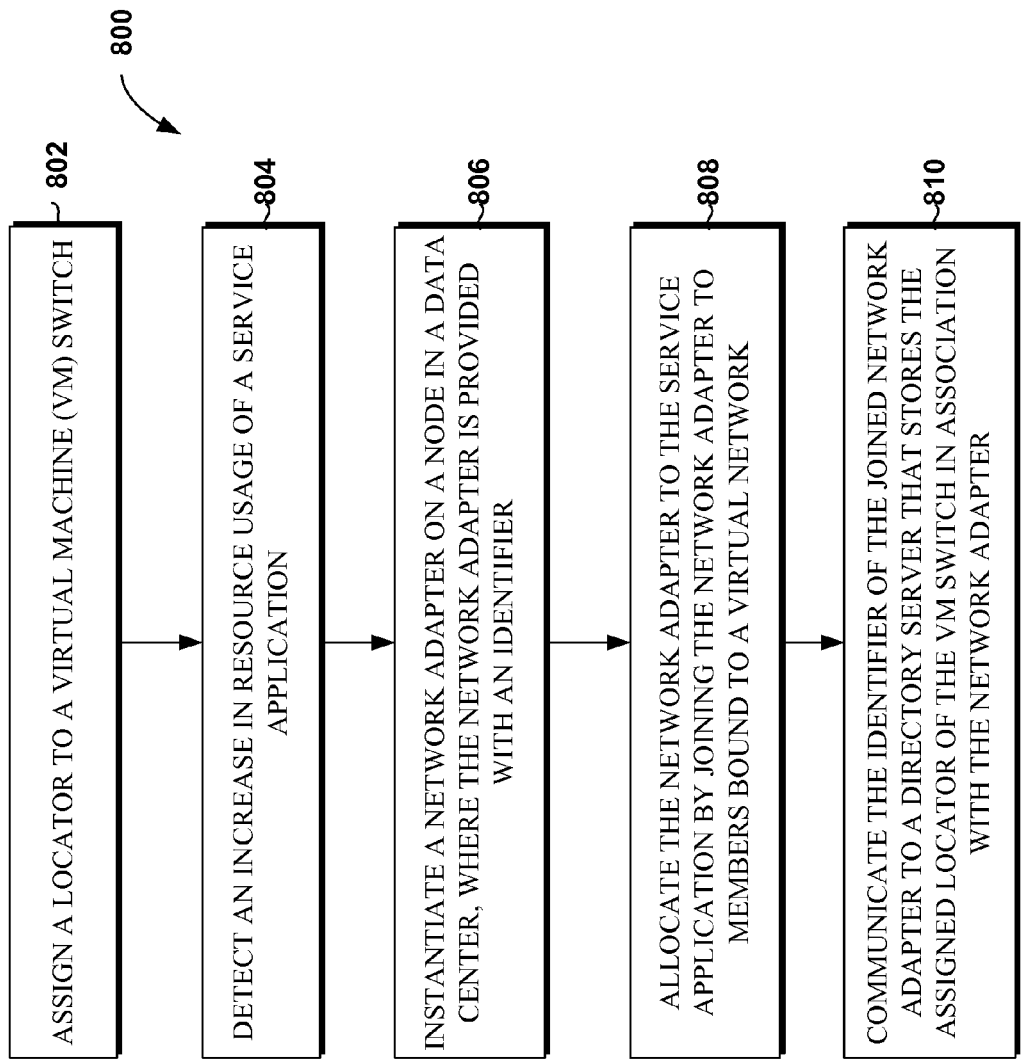
FIG. 8 is a flow diagram showing a method for overseeing expansion of a V-net within a data center, in accordance with an embodiment of the present invention.

Referring now to FIG. 8, a flow diagram is illustrated that shows a method 800 for overseeing expansion of a V-net within a data center, in accordance with an embodiment of the present invention. In an exemplary embodiment, the method 800 involves assigning an internet-layer locator to a VM switch, as indicated at block 802. Generally, the VM switch represents a software-based component that resides on a node of the data center. The method 800 may further include the following steps: detecting an increase in resource usage of a service application (see block 804); instantiating a network adapter on the node (see block 806); and allocating the network adapter to the service application by joining the network adapter to a group of member network adapters bound to the V-net (see block 808). In an exemplary embodiment, the network adapter is provided with an IP address. Upon allocating the network adapter to the service application, the IP address of the joined network adapter is communicated to a directory server, as indicated at block 810. Typically, the directory server (e.g., the directory server 220 of FIG. 2) is configured to store the assigned locator in association with the IP address when the VM switch and the joined network adapter commonly reside on the same node.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable memory having computer-executable instructions embodied thereon that, when executed, perform a method for managing distribution of data packets between a plurality of members of a virtual network (V-net) that are isolated from other machines on a network, the method comprising:

provide a first V-net that comprises the plurality of members running, in part, within at least one data center, wherein the plurality of members include an originating network adapter and a destination network adapter;

detecting the originating network adapter attempting to transmit one or more data packets to the destination network adapter, wherein the one or more data packets are structured with a header that includes a target identifier of the destination network adapter;

performing a resolution process that comprises:
(a) accessing a forwarding table that is associated with the first V-net; and
(b) discovering a locator of a destination-side VM switch, listed in the forwarding table, that corresponds to the target identifier;

encapsulating the one or more data packets to include the locator of destination-side-VM-switch locator within an expanded header; and directing the one or more encapsulated data packets from a source-side VM switch to the destination-side VM switch using the destination-side-VM-switch locator within the expanded header.

2. The one or more computer-readable media of claim 1, wherein the forwarding table represents a mapping between the plurality of members of the first V-net and VM switches that are each located on respective nodes within the at least one data center, and wherein the mapping is designed according to communication policies that govern data-packet traffic between the plurality of members.

3. The one or more computer-readable media of claim 1, wherein one of the plurality of members comprises a network adapter running on a virtual machine or a physical machine.

4. The one or more computer-readable media of claim 1, wherein the destination-side VM switch and the destination network adapter reside within a first node of the at least one data center, and wherein the source-side VM switch and the originating network adapter reside on a second node of the at least one data center.

5. The one or more computer-readable media of claim 4, wherein the forwarding table is maintained within a directory server that is accessible to the source-side VM switch by way of at least one request message, wherein the resolution process further comprises sending the target identifier, including an IP address and a media access control (MAC) address of the destination network adapter, to the directory server packaged within the at least one request message.

6. The one or more computer-readable media of claim 4, wherein a portion of the forwarding table is stored at the source-side VM switch, wherein the resolution process further comprises inspecting the forwarding table locally at the source-side VM switch.

7. The one or more computer-readable media of claim 1, wherein the plurality of members that comprise the first V-net are allocated to a first service application.

8. The one or more computer-readable media of claim 1, the method further comprising providing a second V-net that comprises a plurality of members running, in part, within the at least one data center, wherein one or more of the plurality of members of the first V-net are assigned IP address that overlap IP addresses that are assigned to one or more of the plurality of members of the second V-net.

9. The one or more computer-readable media of claim 8, wherein the plurality of members that comprise the second V-net are allocated to a second service application.

10. The one or more computer-readable media of claim 1, wherein the destination network adapter resides on a node located in an enterprise private network that is remote from the at least one data center, and wherein the source-side VM switch is provisioned with gateway functionality for routing with the enterprise private network.

11. The one or more computer-readable media of claim 10, wherein the method further comprising:
employing the gateway functionality to route the one or more encapsulated data packets to the destination network adapter; and
employing the gateway functionality to apply transport protection to the one or more encapsulated data packets, wherein the transport protection affords a secure tunnel that traverses the at least one data center and the enterprise private network.

* * * * *

UNITED STATES PATENT AND TRADEMARK OFFICE
CERTIFICATE OF CORRECTION

PATENT NO. : 8,407,366 B2
APPLICATION NO. : 12/780673
DATED : March 26, 2013
INVENTOR(S) : Alkhatib et al.

Page 1 of 1

It is certified that error appears in the above-identified patent and that said Letters Patent is hereby corrected as shown below:

In the Specification

In column 14, line 48, delete "created" and insert -- create --, thereof.

Signed and Sealed this
Third Day of February, 2015

Michelle K. Lee
*Deputy Director of the United States Patent and Trademark Office*